J. N. NIXON.
ATTACHMENT TO STREET CARS.
APPLICATION FILED APR. 28, 1908.
921,877.
Patented May 18, 1909.
3 SHEETS—SHEET 1.
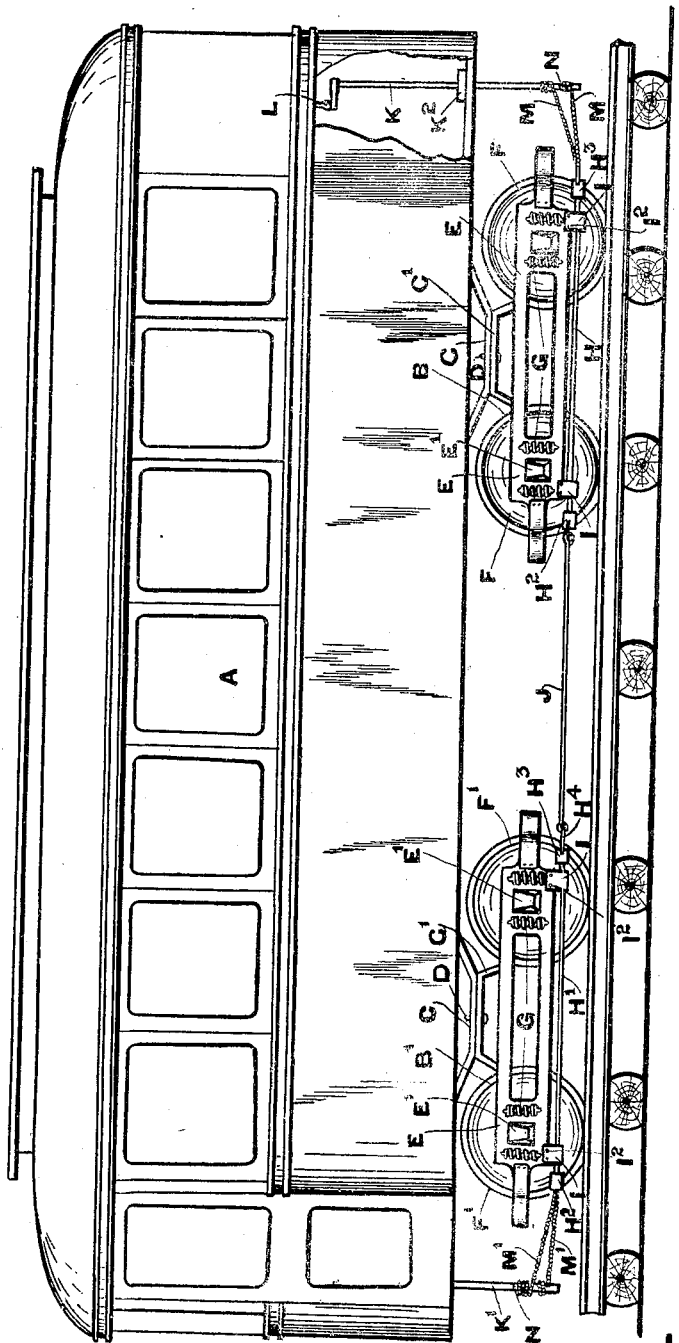
Witnesses.
Inventor

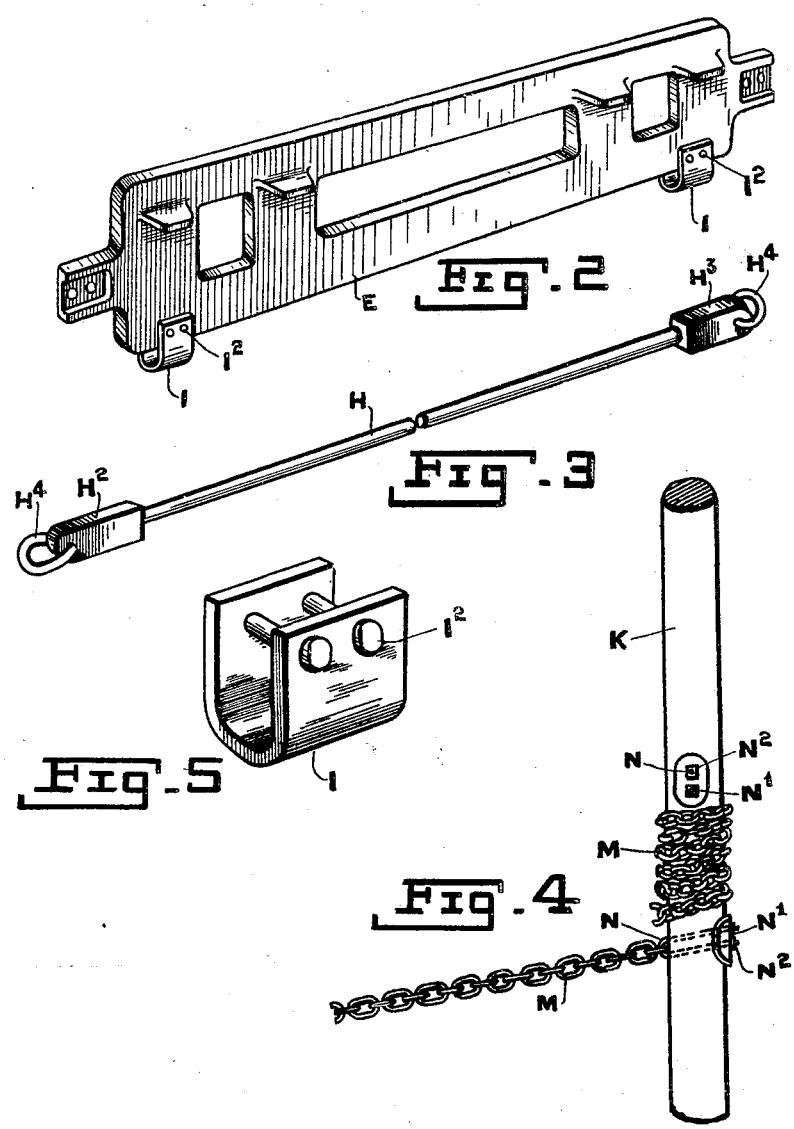

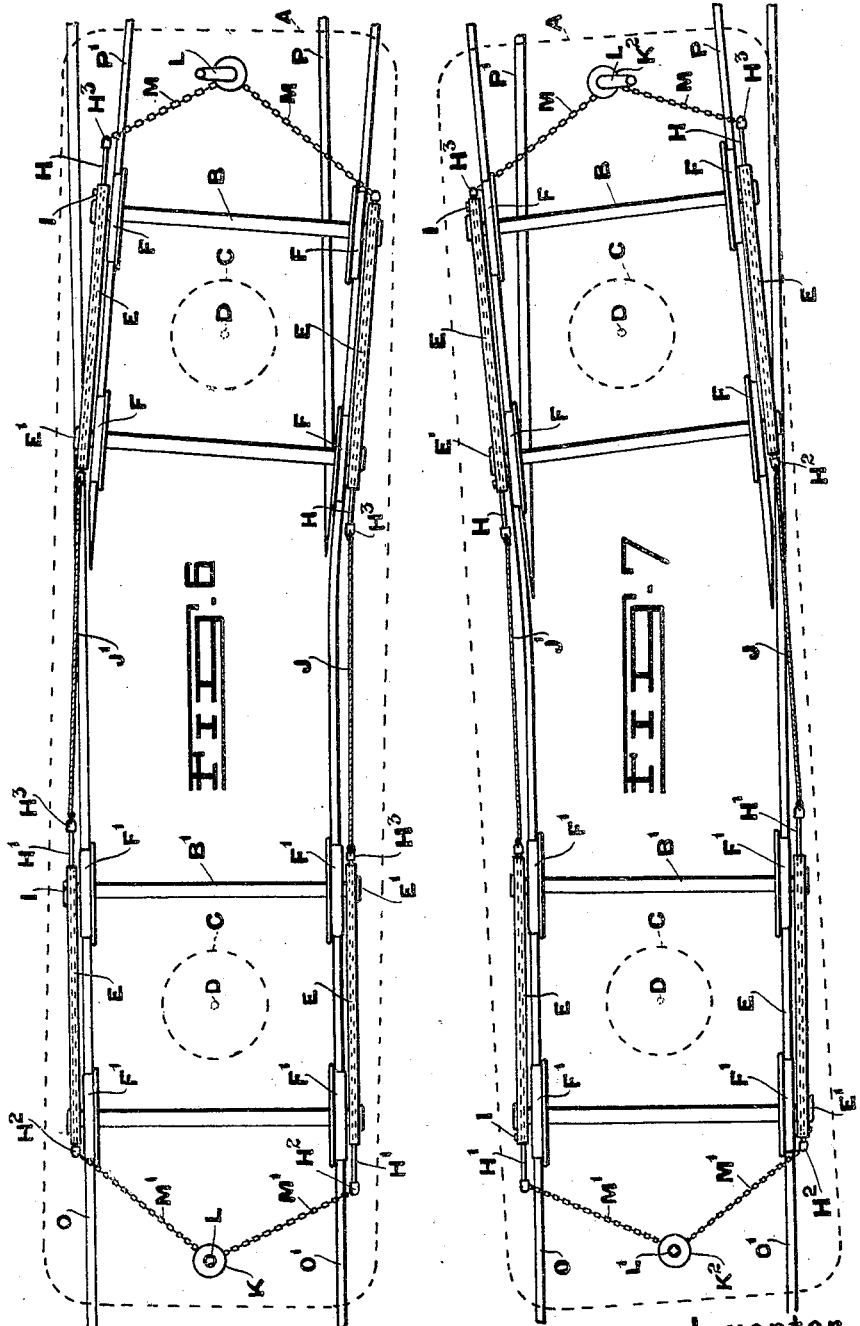

UNITED STATES PATENT OFFICE.

JAMES NEWTON NIXON, OF WINNIPEG, MANITOBA, CANADA.

ATTACHMENT TO STREET-CARS.

No. 921,877.

Specification of Letters Patent.

Patented May 18, 1909.

Application filed April 28, 1908. Serial No. 429,757.

*To all whom it may concern:*

Be it known that I, JAMES NEWTON NIXON, of the city of Winnipeg, in the Province of Manitoba, Canada, painter, have invented certain new and useful Improvements in Attachments to Street-Cars, of which the following is the specification.

My invention relates to improvements in attachments to street cars, more especially an attachment which is carried by the trucks of the car and operated by the motorman, and the object of the invention is to provide a simple mechanism on the car, which when operated will determine the direction of a car at a switch, and which is absolute in so far that it does not require a movable rail at the switch to throw the car from the main line to the switch.

It consists essentially of sets of similar rods carried in opposing pairs by the side frame of the trucks, the said rods being slidable and having enlarged ends, connecting cables between the adjacent ends of the similarly placed rods of the respective sets, standards at either end of the car, chains connecting the forward and rear free ends of the rods to the respective standards and a handle for operating the standards, the parts being arranged and constructed as hereinafter more particularly described.

Figure 1 is a side elevation of a double truck car supplied with my invention, a portion of the front of the car being broken away to show the operating handle. Fig. 2 is an enlarged, detailed, perspective view of one of the side frames of a truck showing a set of supports for the side bars bolted to the side frame of the truck. Fig. 3 is an enlarged, detailed, perspective view of one of the side bars. Fig. 4 is an enlarged, detailed, perspective view of the lower end of one of the standards showing the chains and the manner in which they are secured. Fig. 5 is an enlarged, detailed, perspective view of the support holding the bars to the frame. Fig. 6 is a plan view of a car supplied with my invention the position of the parts being shown when the front truck of the car has taken to the rails of a right hand switch. Fig. 7 is a plan view of a car supplied with my invention the position of the parts being shown when the front truck of the car has taken to the rails of a left hand switch.

In the drawings like characters of reference indicate corresponding parts in each figure.

In operating car systems, the present tendency appears to provide a movable rail or frog for directing the car from the main line to the switch, and such frog is operated either by a mechanism on the car or by a switchman. My invention avoids the necessity of having this movable frog, and the rails are at all times in a set position with regard to each other. Advantage is taken of the fact that the trucks may be turned or swung and in this way cause the wheels to grip or run toward the rails of one track and leave or run away from the other rail of the track.

Referring to the drawings, A is the car body which is supported on forward and rear trucks B B$^1$, respectively, such trucks being attached to the car by means of the ordinary center bearings C C$^1$ and pins D, around which the trucks turn as a center.

E are the side frames of the trucks being of any approved form and E$^1$ are the journal boxes carrying the axles of the wheels F F$^1$.

G are the ordinary spiral springs cushioning the journal boxes.

H H$^1$ are sets of rods somewhat longer than the truck side frames and are grouped in pairs, a pair to each truck. The rods are each fitted with enlarged ends H$^2$ H$^3$, and must be of fairly good size, somewhere about $1\frac{1}{4}$ to $1\frac{1}{2}$ steel rod. It is desirable that one of the ends of the rod be removable, and this could be done by threading the end of the rod and screwing an end of larger size to it, as shown in Fig. 3 at H$^3$. The enlarged ends of the rods carry rings H$^4$.

I I are supports for holding the rods to the trucks and such may be formed from a hand passing around the rod and bolted through its ends, by bolts I$^2$, to the truck side frame. When the rods are in position in the supports they must be free to slide forwardly or backwardly until the enlarged end abuts the supporting bar I.

J J$^1$ are cables connecting the adjacent ends of the similarly placed rods of each set, the cables being connected to the rods simply by passing through the loops H$^4$ and tying back on themselves.

K K$^1$ are standards at the forward and rear end of the car, respectively, the said standards being free to turn in bearings K$^2$ supported on the floor of the car. Each standard is formed with an enlarged lower end to which the chains, as hereinafter explained, are attached, and the upper end is squared at L$^1$ to receive the handle of the lever L.

M M, M¹ M¹ are sets of chains, those M passing from the forward ends of the front set of rods to the standard K, and those M¹ from the rearward end of the rear set of rods to the standard K¹. The chains are fastened to the rods by linking to the rings H⁴ and are held to the standard by U-shaped rods N passing through the standard and supplied at their ends with nuts N¹, screwing over a plate N². With the rod H H¹ in the central position, i. e., extending beyond the bars I equally at either end, the chains M M have each an equal number of turns around the end of the standard and the turns are in such a direction that when one rolls off the other rolls on. The chains M¹ M¹ are arranged in the same manner as those M, and further when the right hand chain of those M rolls up, that of those M¹ must roll off. In this way it will be seen that I have a continuous connection around the car, the whole being operated by the handle L. There must be sufficient room at each end, between the connecting points of the chains with the standards to allow for sufficient rolling up of the chain to bring the enlarged ends of the rods against the bars I.

Referring more particularly to Figs. 6 and 7, when a car approaches a switch, the simple turning of the handle L throws it to the switch or keeps it on the through line. When the car is within ten of fifteen feet of the switch the motorman throws the lever to the right or left, depending on which side the switch is. The operation previous to the position of the car, as shown in Fig. 6, would be as below. The motorman would turn the handle L in a left hand rotation, beginning about ten feet from the switch and gradually tightening as he nears the switch. This by virtue of the chains, the rods and cables pulls the rods on the left hand side of the car forward till the ends H² of the rods abut the rear supporting bars I. The tendency of this is to turn the trucks on their center point and this causes the wheels on the right hand side to grip or run onto the right hand rail and leave the left hand. It will be noticed that one of the rails O passes through the switch and the other O¹ is continuous with the switch, the other main line rail and switch rail, past the switch, being supplied by rails P P¹.

In following the above explanation it will be seen that the right hand wheels of the trucks will stay on the rail O¹, and run away from the rail O, and when the right hand wheels take the switch the left hand wheels will be carried by the rail P¹. When the motorman feels that the wheels of the front truck have gripped the switch rails he releases slightly, and when he considers the rear truck wheels on the switch rails he releases entirely. If it were desired, when approaching, to keep the car on the through line the lever L would be turned with the right hand rotation, which in a manner similar to that above explained would cause the left hand wheel of the trucks to grip the left hand rail or that O, and the right hand rails would follow through on the rails O¹ and P, respectively. It is considered that a further description as applied to taking a left hand switch, as shown in Fig. 7 is unnecessary, as the operation is simply the reverse to that of the right hand switch, which has been fully explained.

It is to be understood that although I have shown the rods H, H¹ supported from beneath the side frames of the truck yet their position has not necessarily to be there, and I wish it to be understood that any manner in which they may be supported or placed in order to give the turning effect to the trucks comes within the scope of my invention.

What I claim as my invention is:

In a device of the class described the combination with a set of double trucks supporting the car body of sets of slidable rods carried by the side frames of the trucks, there being a set to a truck, the said rods having enlarged ends adapted to abut the supports holding the rods to the side frames, cables connecting the adjacent ends of the rods of the opposing sets, standards mounted at the forward and rear end of the car body, chains connecting the forward ends, respectively, of the front set of rods to the lever end of the front standard, chains connecting the rear ends of the rear set of rods to the lower end of the rear standard, and a handle adapted to operate the standards, as and for the purpose specified.

Signed at Winnipeg, in the Province of Manitoba, this 20th day of April 1908.

JAS. NEWTON NIXON.

In the presence of—
JAS. M. TAPLEY,
GERALD S. ROXBURGH.